US008325924B2

(12) United States Patent
Acar et al.

(10) Patent No.: US 8,325,924 B2
(45) Date of Patent: Dec. 4, 2012

(54) MANAGING GROUP KEYS

(75) Inventors: Tolga Acar, Sammamish, WA (US);
Josh Benaloh, Redmond, WA (US);
Niels Thomas Ferguson, Redmond, WA (US); Carl M. Ellison, Medina, WA (US); Mira Belenkiy, Redmond, WA (US); Duy Lan Nguyen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 960 days.

(21) Appl. No.: 12/389,217

(22) Filed: Feb. 19, 2009

(65) Prior Publication Data

US 2010/0208898 A1 Aug. 19, 2010

(51) Int. Cl.
*H04L 9/00* (2006.01)
(52) U.S. Cl. .......................................... 380/277; 380/44
(58) Field of Classification Search .......... 380/277–279, 380/281, 284, 44; 713/171, 189, 193–194
See application file for complete search history.

(56) References Cited

U.S. PATENT DOCUMENTS

| | | | |
|---|---|---|---|
| 6,038,322 A * | 3/2000 | Harkins | 380/279 |
| 6,240,188 B1 | 5/2001 | Dondeti et al. | |
| 6,295,361 B1 * | 9/2001 | Kadansky et al. | 380/278 |
| 6,785,809 B1 | 8/2004 | Hardjono | |
| 7,089,211 B1 | 8/2006 | Trostle et al. | |
| 7,234,063 B1 | 6/2007 | Baugher et al. | |
| 7,382,884 B2 | 6/2008 | Itkis | |
| 7,441,117 B2 | 10/2008 | Matsuzaki et al. | |
| 2002/0071563 A1 | 6/2002 | Kurn et al. | |
| 2007/0288391 A1 | 12/2007 | Nakamura et al. | |

OTHER PUBLICATIONS

Bartolik, Pete, "Windows Vista Makes Security a Policy Decision", retrieved at <<http://www.microsoft.com/canada/midsizebusinessvalue/Windows-Vista-policy.mspx>>, dated 2008, retrieved on Dec. 2, 2008, 2 pages.
Poulton, Don., "Group Policy and Active Directory Security", retrieved at <<http://www.informit.com/articles/article.aspx?p=1245849>>, dated: Sep. 30, 2008, 18 pages.
Tselkov, et al., "A Model of Software Cryptography System for Data Protection in Distribution Information Systems", South Eastern Europe Conference on Regional Security Through Data Protection, Belgrade, Serbia, Dec. 1-4, 2003, retrieved at <<http://www.dataprotection2003.info/speakers/Veselin_Tselkov/presentation.pdf>>, pp. 1-9.
"The Administrator Accounts Security Planning Guide", retrieved at <<http://www.microsoft.com/technet/security/guidance/serversecurity/administratoraccounts/aapgch02.mspx>>, dated Jun. 30, 2005, 4 pages.

(Continued)

*Primary Examiner* — Hosuk Song

(57) ABSTRACT

In an example, one or more cryptographic keys may be associated with a group. Any member of the group may use the key to encrypt and decrypt information, thereby allowing members of the group to share encrypted information. Domain controllers (DCs) maintain copies of the group's keys. The DCs may synchronize with each other, so that each DC may have a copy of the group's keys. Keys may have expiration dates, and any client connected to a DC may generate a new key when a key is nearing expiration. The various clients may create new keys at differing amounts of time before expiration on various DCs. DCs that store keys early thus may have time to propagate the newly-created keys through synchronization before other DCs are requested to store keys created by other clients. In this way, the creation of an excessive number of new keys may be avoided.

19 Claims, 6 Drawing Sheets

OTHER PUBLICATIONS

Harney, et al. "Group Key Management Protocol (GKMP) Architecture", retrieved at <<http://www.ietf.org/rfc/rfc2094.txt?number=2094>>, dated: Jul. 1997, pp. 29.

"EncryptMessage(Kerberos) Function" retrieved at <<http://msdn2.microsoft.com/en-us/library/aa375385(VS.85).aspx>>, dated: 2008, pp. 4.

"InitializeSecurityContext(Kerberos) Function", retrieved at <<http://msdn2.microsoft.com/en-us/library/aa375507(VS.85).aspx>>, dated: 2008, 7 pages.

"How to Mark an Attribute as Confidential in Windows Server 2003 SP 1", retrieved at <<http://support.microsoft.com/kb/922836>>, dated: Oct. 11, 2007, 10 pages.

"LSA Policy", retrieved at <<http://msdn2.microsoft.com/en-us/library/ms721831(VS.85).aspx>>, dated: 2008, 1 page.

"Octopus", retrieved at <<http://sharepoint/sites/Opin/Octopus/default.aspx>>, dated: 2008, 1 page.

"Open Protocol Specifications", retrieved at <<http://msdn.microsoft.com/en-us/ibrary/cc203350.aspx>>dated: 2008, 1 page.

"[MS-BKRP]: BackupKey remote protocol Specification" retrieved at <<http://msdn.microsoft.com/en-us/library/cc224123.aspx>>, dated Jul. 20, 2007, revised through Jan. 16, 2009, pp. 1-48.

"[MS-ERREF]: Windows Error Codes" retrieved at <<http://download.microsoft.com/download/9/5/E/95EF68AF-9026-4BB0-A41D-A4F81802D92C/%5bMS-ERREF%5d.pdf>>, dated: Feb. 14, 2008, revised through Oct. 24, 2008, pp. 1-487.

"[MS-KILE]: Kerberos Protocol Extensions", retrieved at <<http://download.microsoft.com/download/9/5/E/95EF66AF-9026-4BB0-A41D-A4F81802D92C/%5bMS-KILE%5d.pdf>>, dated Oct. 22, 2006, revised through Oct. 24, 2008, pp. 1-50.

"[MS-SPNG]:Simple and Protected Generic Security Service Application Program Interface Negotiation Mechanism (SPNEGO) Protocol Extensions", retrieved at <<http://download.microsoft.com/download/9/5/E/95EF66AF-9026-4BB0-A41D-A4F81802D92C/%5bMS-SPNG%5d.pdf>>, dated: Oct. 22, 2006, revised through Oct. 24, 2008, pp. 1-23.

Neuman, et al., "The Kerberos Network Authentication Service (V5)", retrieved at <<http://www.ietf.org/rfc/rfc4120.txt>>, dated: Jul. 2005, 176 pages.

Kaliski JR, Burton S., "A Layman's Guide to a Subset of ASN.1, BER, and DER", retrieved at <<ftp://ftp.rsa.com/pub/pkcs/ascii/layman.asc>>, Nov. 1, 1991, 43 pages.

"Windows Data Protection", retrieved at <<http://msdn.microsoft.com/en-us/library/ms995355.aspx>>, Oct. 2001, 22 pages.

Chen, Lily., "Recommendation for Key Derivation Using Pseudorandom Functions", "Computer Security", Computer Security Division Information Technology Laboratory, retrieved at <<http://csrc.nist.gov/publications/drafts/800-108/Draft_SP-800-108_April-2008.pdf>>, Apr. 2008, pp. 1-20.

* cited by examiner

MANAGING GROUP KEYS

BACKGROUND

Cryptographic keys may be used to protect data. Data may be encrypted with a key, which prevents anyone from reading the data unless they have access to the key. The key is managed in a way that prevents unauthorized entities from accessing the key. In addition to using keys to encrypt and decrypt data, keys may be used for other purposes, such as authentication, digital signatures, generation of pseudo-random numbers, or any other cryptographic computation that uses keys.

There are various mechanisms that bind a key to an entity. A specific user is an example of an entity to which a key may be bound. For example, the Data Protection Application Programming Interface (DPAPI) can associate a key with a particular user's logon credentials. With DPAPI, when a key is bound to a user, the key is accessible only when that user is logged into the machine on which access to the key is sought.

There are various scenarios in which it may make sense to bind a key to some target other than a specific user.

SUMMARY

Cryptographic keys may be associated with a group, and may be stored by a mechanism that limits access to the keys to members of the group. For example, the ACTIVE DIRECTORY service may be used to associate a given item of data with a particular group. A group's cryptographic keys, the policies associated with the use of those keys, and other metadata, may be stored in a container maintained by the ACTIVE DIRECTORY service. When an entity runs an application that wants to encrypt or decrypt data that belongs to the group, that application may request the group's keys from the service. The service may provide the keys to the requesting application, or may decline to provide those keys, depending on whether the application is being run by a member of the group. The ACTIVE DIRECTORY service provides an example infrastructure that may be used to control access to data based on group membership, but any other mechanism could be used.

In one example model of key management, keys have a limited longevity, so they recurrently expire and get replaced. At any given time, the group may have one current key that is used for new encryption jobs (such as encryption of new data or re-encryption of old data), but older keys continue to be stored so that they may be used to decrypt any data that was encrypted before the current key was created. When the keys for the group are stored on replicated servers that synchronize with each other intermittently, there is a window of time when some servers will have the newest key and others will not. A client may create a new key if the particular server that it contacts provides an expired or near-expiring key. The client may then use the key for encryption, and may also store the key on the server for future use by the group. However, if each client creates a new key at a specific time relative to the current key's expiration, then an excessive number of keys may accumulate as different clients may create new keys before one client's replacement key has had a chance to propagate through the servers. To avoid this issue, different clients may create new keys at differing amounts of time before the current keys expires, which increases the likelihood that a server on which that client stores the key will propagate the key to other servers before other clients create new keys of their own. This technique reduces the likelihood that each client will create its own new key in anticipation of the current key's expiring, thereby reducing the accumulation of keys. Techniques are described herein that may be used to stagger the times at which different clients create new keys.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
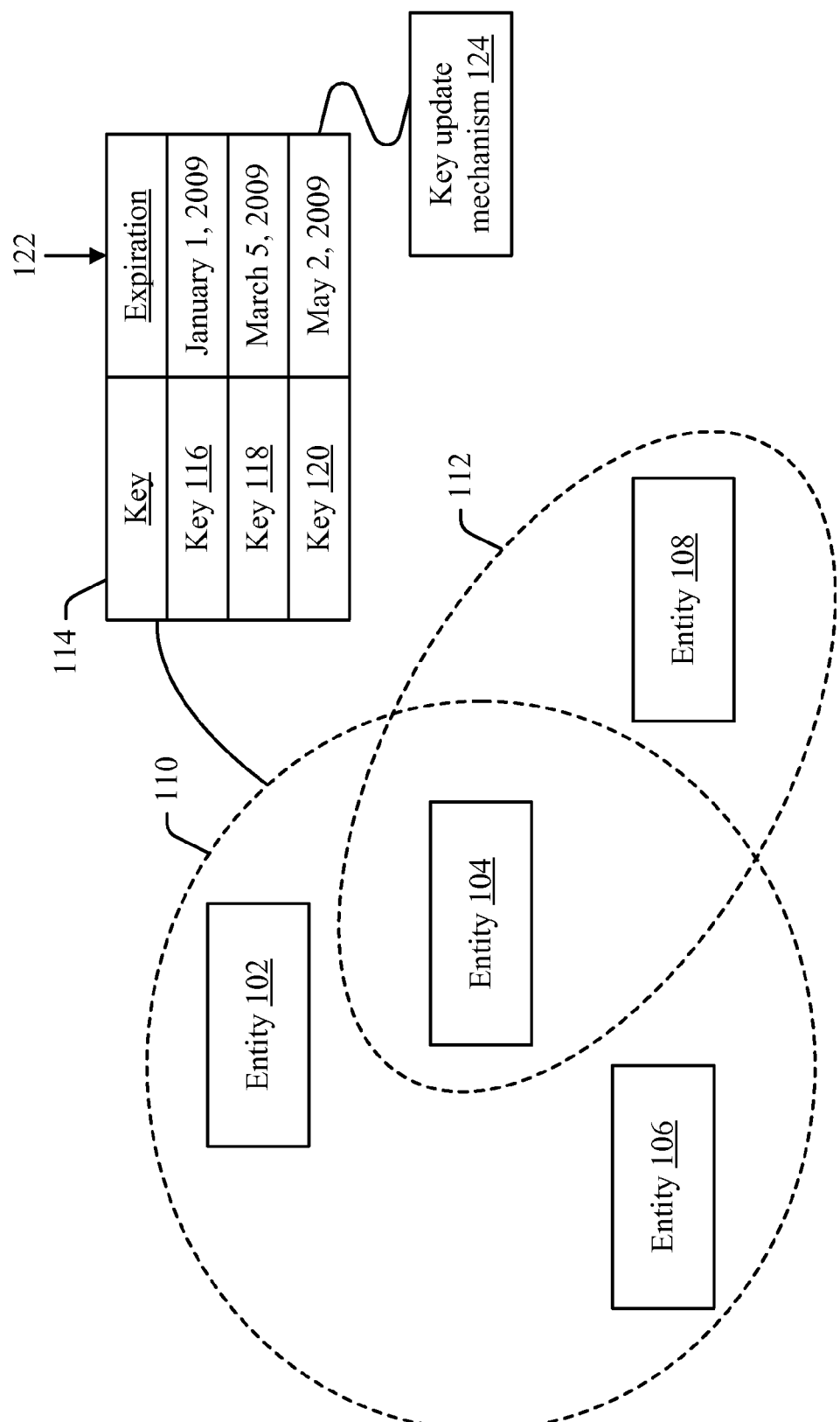
FIG. 1 is a block diagram of an example of groups with which keys may be associated.

There are various situations in which data are to be protected by encryption. For example, a user may have files, e-mails, credentials, etc., that are to be encrypted, and there may be reasons to ensure that the data can only be decrypted by the specific user who owns the data. Schemes exist that allow data to be encrypted in such a way that only a particular user can access the data. For example, DPAPI, which is provided with various versions of the MICROSOFT WINDOWS operating systems, allows data to be encrypted with logon secrets associated with the user, or with domain authentication secrets (in the case where the user's identity is managed as part of a domain). Mechanisms such as DPAPI are typically used to protect keys that applications or other programs use to encrypt/decrypt data on the user's behalf. For example, an E-mail application could generate a symmetric key that is used to encrypt and decrypt a particular user's e-mail, and could use DPAPI to protect that key. When the user's e-mail is to be decrypted, the E-mail application calls on DPAPI to provide the key, and DPAPI will respond by providing the key if the user to whom that key has been sealed is presently logged in. (In addition to encryption and decryption, the keys may also be used for other cryptographic applications, such as authentication, digital signatures, pseudo-random number generation, etc.)

While these kinds of schemes can protect keys or other data for the benefit of one user, there are some situations where it makes sense to protect data for a group of users or machines. That is, there may be encrypted data that is to be accessed by members of a group. If a key for the data could be made accessible to a group of users and/or machines, then all members of the group could use the key to encrypt and decrypt the data. But mechanisms like DPAPI can only protect data for a specific user's benefit, and thus are of little use in protecting an encryption/decryption key (or other data) that is to be shared among group members.

The subject matter described herein provides a way to protect a key for the benefit of a group. There are existing mechanisms that recognize the concept of a group and that can control access to data in such a way that access to a particular piece of data is limited to the group. These existing mechanisms may be leveraged to limit access to a key (or access to a collection of keys) to a particular group. The ACTIVE DIRECTORY service is an example of a mechanism that recognizes the concept of a group and that can limit access to data to a particular group. It is noted that the subject matter herein may be implemented using the underlying functionality of the ACTIVE DIRECTORY service, and without making changes to that underlying functionality. However, the subject matter herein is not limited to the use of the ACTIVE DIRECTORY service. Any mechanism may be used that recognizes the concept of a group, and that can be configured to limit access to a piece of data to a specific group. For purposes of illustration, examples are described in which the group keys are used to encrypt and decrypt data for the group. However, it will be understood that the group keys could be used for any sort of cryptographic process or computation, such as those mentioned above (e.g., authentication, digital signatures, pseudo-random numbers, etc.).

Turning now to the drawings, FIG. 1 shows an example of groups, and of how sets of keys may be associated with groups. FIG. 1 shows entities 102, 104, 106, and 108. In order to illustrate the example, four entities 102-108 are shown, although there could be any number of entities that are members of groups. A given implementation of groups could allow any type of entities (or combination of types of entities) as being the members of a group. For example, one implementation of a group might allow specific users to be members of groups. Another implementation could allow specific machines to be members of the group. Yet another implementation might allow both types of entities to be members of groups, or might even allow groups to be members of other groups. The subject matter herein applies to any concept of a group, regardless of the types of entities (or combinations of entities) that may be members.

Entities 102, 104, and 106 are members of group 110. Entities 104 and 108 are members of group 112. As shown, group membership may overlap such that a given entity (e.g., entity 104) is part of more than one group. Two example groups 110 and 112 are shown in FIG. 1, although any number of groups could be defined.

Each group may be associated with its own collection of keys. For example, group 110 is associated with set 114 of keys, which comprises keys 116, 118, and 120. Similarly, group 112 may also be associated with a set of keys (although to simplify the illustration of FIG. 1, group 112's set of keys is not shown). A policy that governs the use of the keys may allow the keys to be provided to members of the group.

Keys may have expiration dates 122. The table in FIG. 1 that depicts set 114 shows the expiration dates for each of keys 116-118. In one example, keys do not disappear on their expiration dates, but may cease to be used for new encryption when they expire or have been superseded by newer keys. Older keys (e.g., those that have expired and/or have been superseded) may be stored so that they may be used by members of the group to decrypt data that was previously encrypted with that older key. (Application-enforced re-encryption policies may cause old data to be re-encrypted with new keys, thereby rendering the older keys obsolete. However, since the mechanism that maintains the groups keys may not know the applications' re-encryption policies, expired and superseded keys may be stored indefinitely so that data encrypted with those keys does not become inaccessible, even if the applications that use those keys have not chosen to re-encrypt data with new keys.)

In some applications, there may be reason to encrypt all data with a set of keys in a group by an encrypting entity, e.g., an automated or manually started computer service. The encrypted documents may be stored in a repository that the encrypting entity does not have access to or does not know about. When and if there is reason to destroy the encrypted documents, it may be difficult to find all copies of the documents and to delete them irretrievably. Instead, destroying the keys that encrypted the data provides a controlled and a convenient way of data destruction. The encrypted documents without the keys cannot be decrypted, where the difficulty of inaccessibility is defined by the strength of the cryptographic algorithms used to encrypt the document. This approach provides an easy document (or any data in general) destruction facility.

The creation of new keys may be controlled by a key update mechanism 124. Key update mechanism 124 may incorporate techniques that are described below. In general, key update mechanism 124 may allow keys to be updated without creating an excessive number of new keys, even when mirrored servers that generate the keys do not synchronize with each other very often. This issue, and techniques for addressing it, are further described below.

Figure 2:
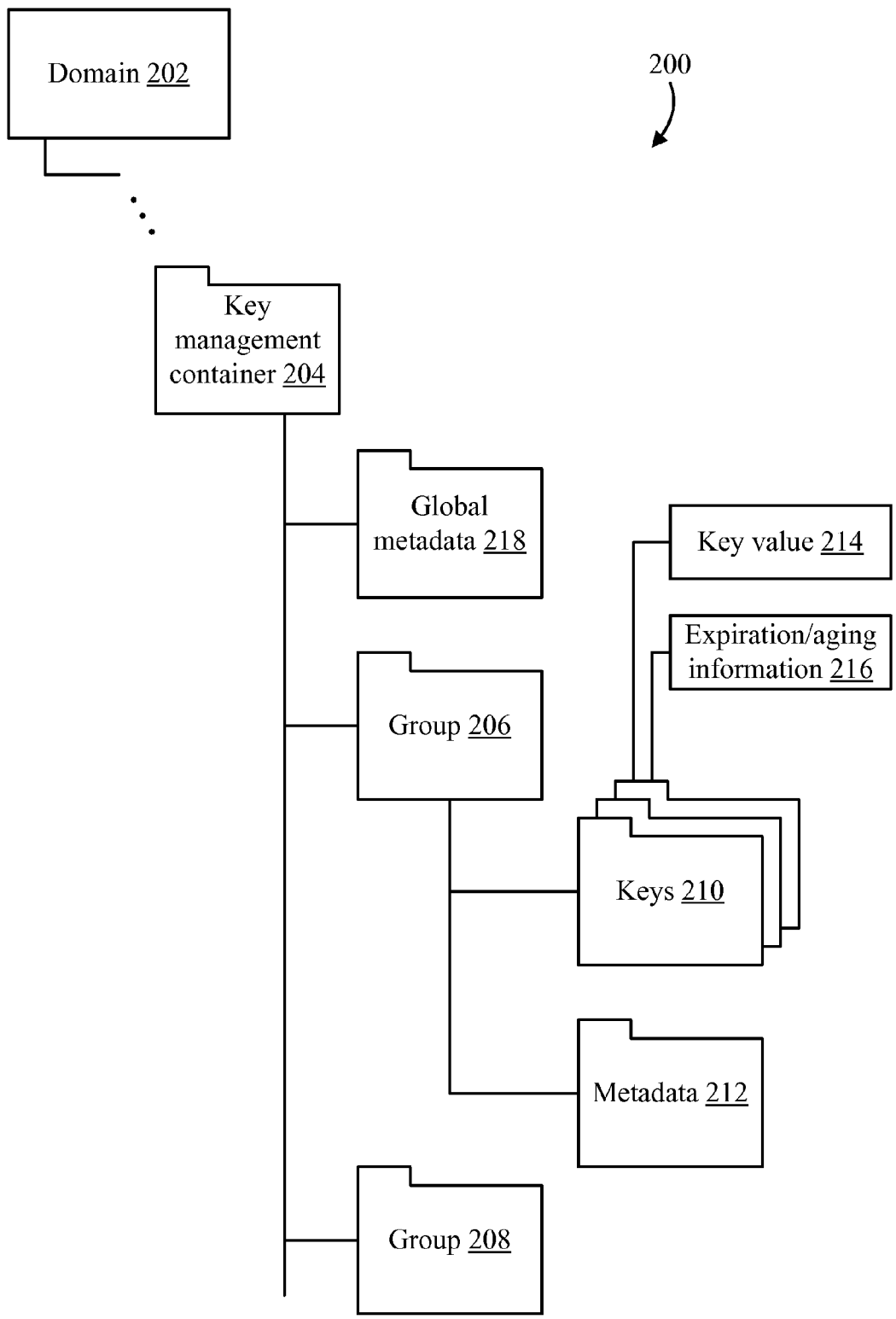
FIG. 2 is a block diagram of an example structure in which keys may be stored for a group.

FIG. 2 shows an example of how keys may be stored for a group. The example of FIG. 2 shows how keys might be stored by the ACTIVE DIRECTORY service for groups that are part of a domain. However, the structure shown in FIG. 2 is merely an example, and any appropriate data structures, or any appropriate system that maintains those data structures, could be used to store keys for a group.

Structure 200 represents hierarchical relationship among data. At one level of the hierarchy is domain 202. Domain 202 represents a collection of computers that share access to a central directory database, such as one managed by the ACTIVE DIRECTORY service. Domain 202 may contain information such as user account information for users in the domain, information about security policies that apply to the domain, information about membership in groups, or other information about the domain. The various types of information about the domain may be stored within containers under the heading of domain 202. The containers may be nested an arbitrary number of levels deep. There may be several containers under domain 202, and there may be several levels of nesting of containers within containers. One example of a container that may exist at some level under domain 202 is key management container 204, in which associations between keys and groups may be stored. Key management container 204 may be any number of levels in the hierarchy below domain 202, as indicated by the diagonal ellipsis connecting domain 202 to key management container 204.

The associations between groups and keys may be organized under key management container, such that each group has its own container within key management container 204. For example, structure 200 shows containers for two groups 206 and 208, although there could be any number groups, each represented by its own container. The data within the containers for groups 206 and 208 might not contain the data that defines the existence of the groups themselves. The groups may be defined elsewhere in the hierarchy under domain 202. However, given some groups whose existence and membership has been defined somewhere, the containers representing groups 206 and 208 contain the keys associated with those groups.

There are various ways to store the association between a set of keys and the group to which the keys belong. However, an example way to store this association is shown in FIG. 2. Under the container for group 206, there are objects representing keys 210 and the metadata 212 that applies to the keys. As noted above, each group may contain several keys (although at any given time, one of those key may be designated as the current key to use for new encryption of data). Thus, the objects for keys 210 are shown as a plurality of folders, where each folder may represent one key. Within each of the key objects, various types of information may be stored. For example, each key object may store the key value 214, which contains (or implies) the actual data that may be provided to an encryption algorithm in order to encrypt or decrypt data. Each key object may also contain expiration and/or aging information 216. Information 216 may describe the expiration date of the key in some manner—e.g., by stating the actual expiration date, by stating the date on which the key was created along with its longevity, or through some other kind of information. In addition to the key value 214 and information 216, each key object could also contain any other data that pertains to a particular key.

Metadata 212 may also be stored under the container for group 206, and may contain various information concerning keys 210, such as a policy governing the use of the keys. For example, metadata 212 may indicate which of keys 210 is the current key to use for new encryption jobs (e.g., metadata 212 may point to the particular key object that represents the current key, as indicated at 218). Metadata 212 may also indicate the specific encryption algorithm to be used with a key. Any other type of information relating to the keys 210 for group 206 may be stored in metadata 212.

Although not shown, group 208 (or any other group for which a set of keys is stored) may have similar containers. Thus, group 208 may have its own set of keys, and its own metadata relating to those keys.

The foregoing discusses an example way of organizing data that relates to groups and their keys, but other ways of organizing the data are also possible. For example, metadata 212 and keys 210 are shown as being in different containers, but some or all of the metadata could be stored with the keys. Thus, instead of having metadata 212 that applies to all of the keys in group 206, there could be some "per key" metadata that applies to a specific key, and that metadata could be stored with the key. (E.g., the specific encryption algorithm that is to be used with a key is an example of metadata that might be applied on a per-key basis.) Additionally, key management container 204 could have a container for "global" metadata 218. Global metadata 218 might apply to all keys, unless overridden by some per-group or per-key metadata. (Or, in greater generality, there could be a rule that resolves which metadata applies when two or more of global, per-group, and/or per-key metadata are present.)

Figure 3:
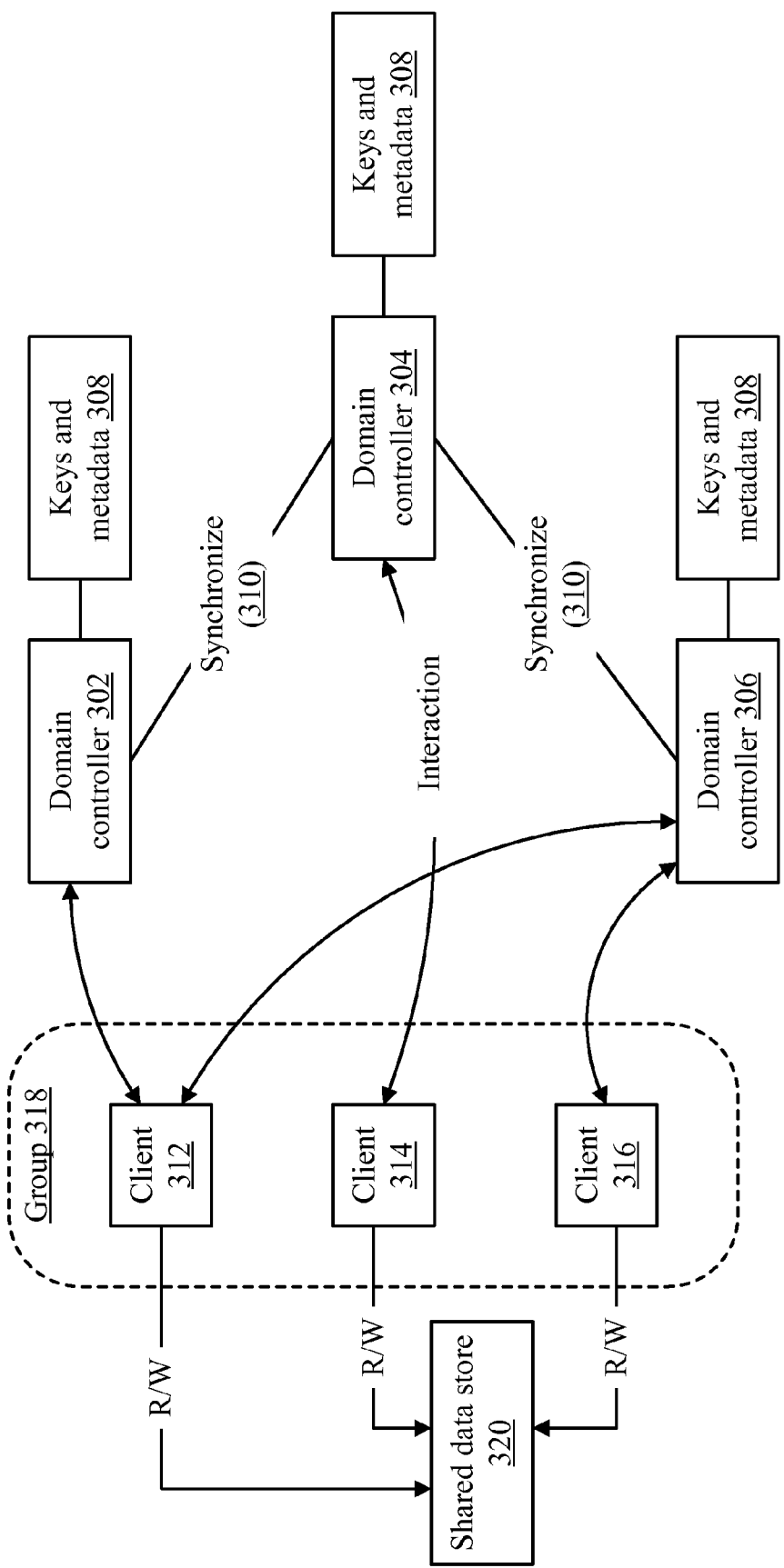
FIG. 3 is a block diagram of an example system in which a domain is administered by a plurality of domain controllers.

Typically, the domain is administered by several different domain controllers, which maintain mirrored copies of the information for that domain. Thus, domain 202, and the various information organized under domain 202, may exist on a plurality of domain controllers. The domain controllers may synchronize with each other so that they converge on maintaining copies of the same information for the various domains (although the synchronization may not occur continuously, so there may be a period of time when an update made on one domain controller has not yet been synchronized to another domain controller). During synchronization, two domain controllers may compare their respective information, and each may send the other any new information (e.g., new keys, new metadata, new group memberships, etc.) that the other does not have. FIG. 3 shows an example system in which a domain is administered by a collection of domain controllers.

Domain controllers 302, 304, and 306 collectively administer a domain. Each domain controller may, for example, be a server machine. Domain controllers may be located in physically separate locations separated by some physical distance, and they may be communicatively connected to each other by a network; however, domain controllers could be located anywhere, in any relative proximity to each other. In one example, domain controllers that are distant from each other (e.g., one in North America, one in Africa) may synchronize less frequently than domain controllers that are near each other, and thus, the techniques described herein may be used to prevent excessive accumulation of keys in view of the infrequent synchronization of these distant domain controllers. Each of domain controllers 302-306 may have a copy of the information that relates to that domain. For example, each of domain controllers may keep a copy of structure 200 (shown in FIG. 2), and of the information stored therein. An example of the kind of information that each domain controller may store is the keys for each group, and any policies or other metadata associated with those keys. Thus, copies keys and metadata (indicated by numeral 308) may be stored in each of domain controllers 302-306.

Domain controllers may synchronize with each other (as shown by numeral 310) so that the domain controllers converge on having the same information as each other. FIG. 3 shows domain controllers 302 and 304 synchronizing with each other, and also shows domain controllers 304 and 306 synchronizing with each other, although any combination of domain controllers could synchronize with each other.

In order to participate in a domain, clients interact with the domain controllers. One aspect of replicated domain controllers is that a client can perform domain-related actions (e.g., logging in, accessing data that is managed by domain controllers, etc.) without regard to which domain controller the client interacts with. For example, FIG. 3, shows three clients 312, 314, and 316, which perform various types of interactions with domain controllers 302-306 (as indicated by the double-ended arrows connecting various combinations of clients 312-316 with domain controllers 302-306). When a client is requesting services from the domain controller, the particular domain controller with which the client connects may be chosen based on various factors. For example, domain controllers 302-306 may be in physically separate locations, and which domain controller the client connects to may be based on where the client is located. For example, a company with offices in several cities might maintain a domain controller in each office. An employee may use his or her laptop (which is an example of a client) to access the company's network in any one of the offices, where accessing the company's network, in this example, may involve authenticating the client to the domain controller. The network may be configured so that the client communicates with the domain controller for the office in which the client is located at the time of the communication. As another example, several domain controllers may exist for a high-traffic domain in order to allow the load to be spread among them, in which case the particular domain controller with which the laptop communicates may be chosen based on a load-balancing algorithm. Thus, a given client might be communicating with any one of several domain controllers, depending on the different domain controllers' respective loads. When plural domain controllers exist, synchronization of the domain controllers allows the client to receive basically the same data and functionality from a domain controller, regardless of which domain controller the client accesses.

Clients that are members of a group may share encrypted data using techniques that are described herein. Domain controllers, as noted above, may associate a set of keys with a group, so that any member of the group may access those keys to encrypt and decrypt data. In the example of FIG. 3, clients 312-316 are all members of group 318. Domain controllers 302-306 store a set of keys for group 318, and are aware that clients 312-316 are members of group 318. Thus, upon receiving an appropriate request from any of clients 312-316, any of domain controllers 302-306 may provide the requestor with the keys for group 318. Clients 312-316 might issue these requests through an application that wants to encrypt or decrypt data. For example, an E-mail application might maintain a group inbox that is accessible to any member of group 318. In order to secure incoming e-mail so that it can be read by members of group 318 but not by others, when the E-mail application receives new messages, it may contact one of domain controllers 302-306 to get the current encryption key for that group (or may use a local copy of a non-expired encryption key that the client stores). The E-mail application may then encrypt the messages and may store them in shared data store 320, which is accessible to any of clients 312-316. All of clients 312-316, in this example, have access to shared data store 320. So, when one of clients 312-316 wants to read the E-mail, it contacts one of domain controllers 302-306 and requests the keys (or may use a local copy of the keys, if the client has a local copy). The client may then retrieve the E-mail from shared data store 320 and may decrypt the E-mail using the key.

Figure 4:
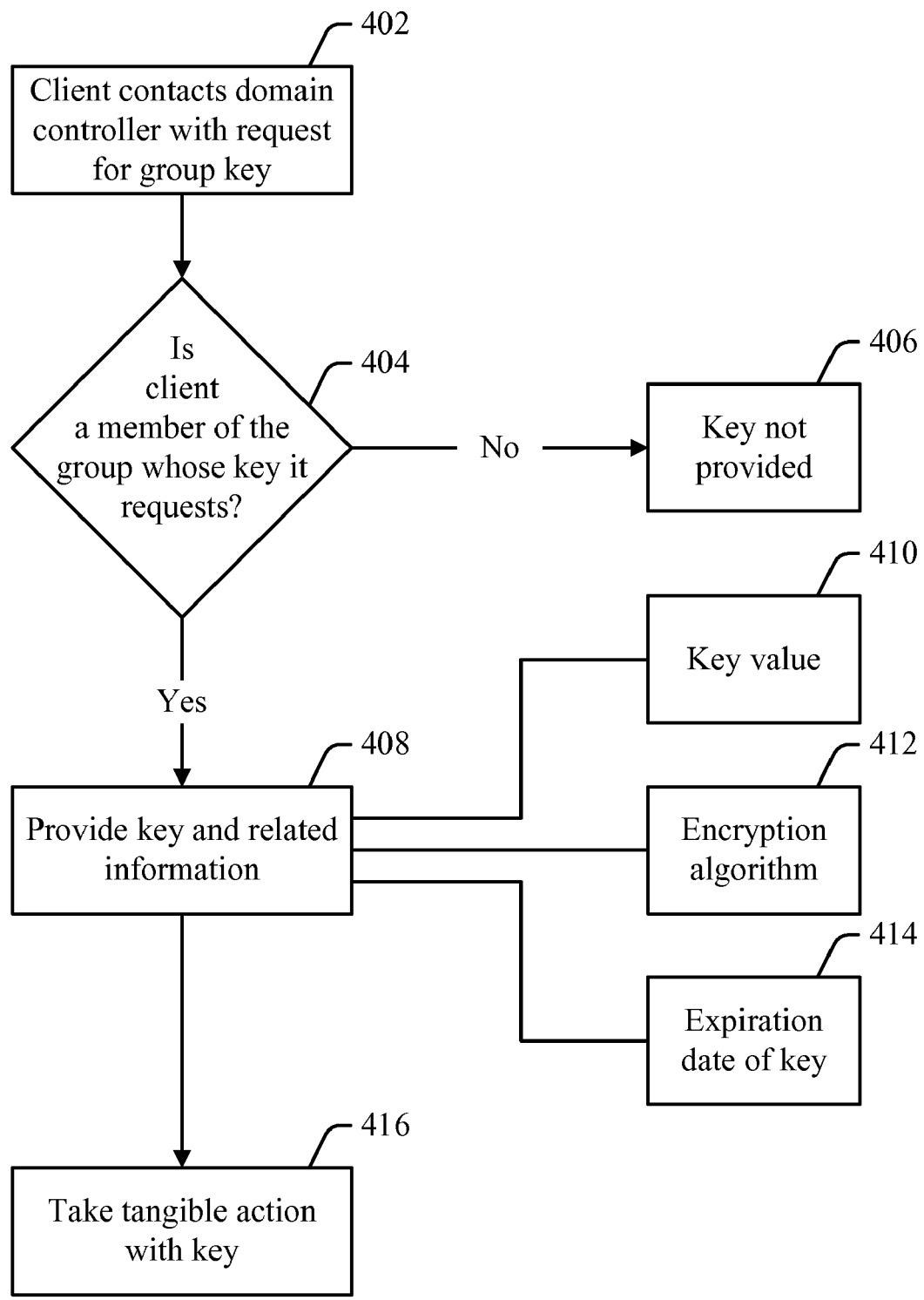
FIG. 4 is a flow diagram of an example process by which group keys are obtained and used by clients.
Figure 5:
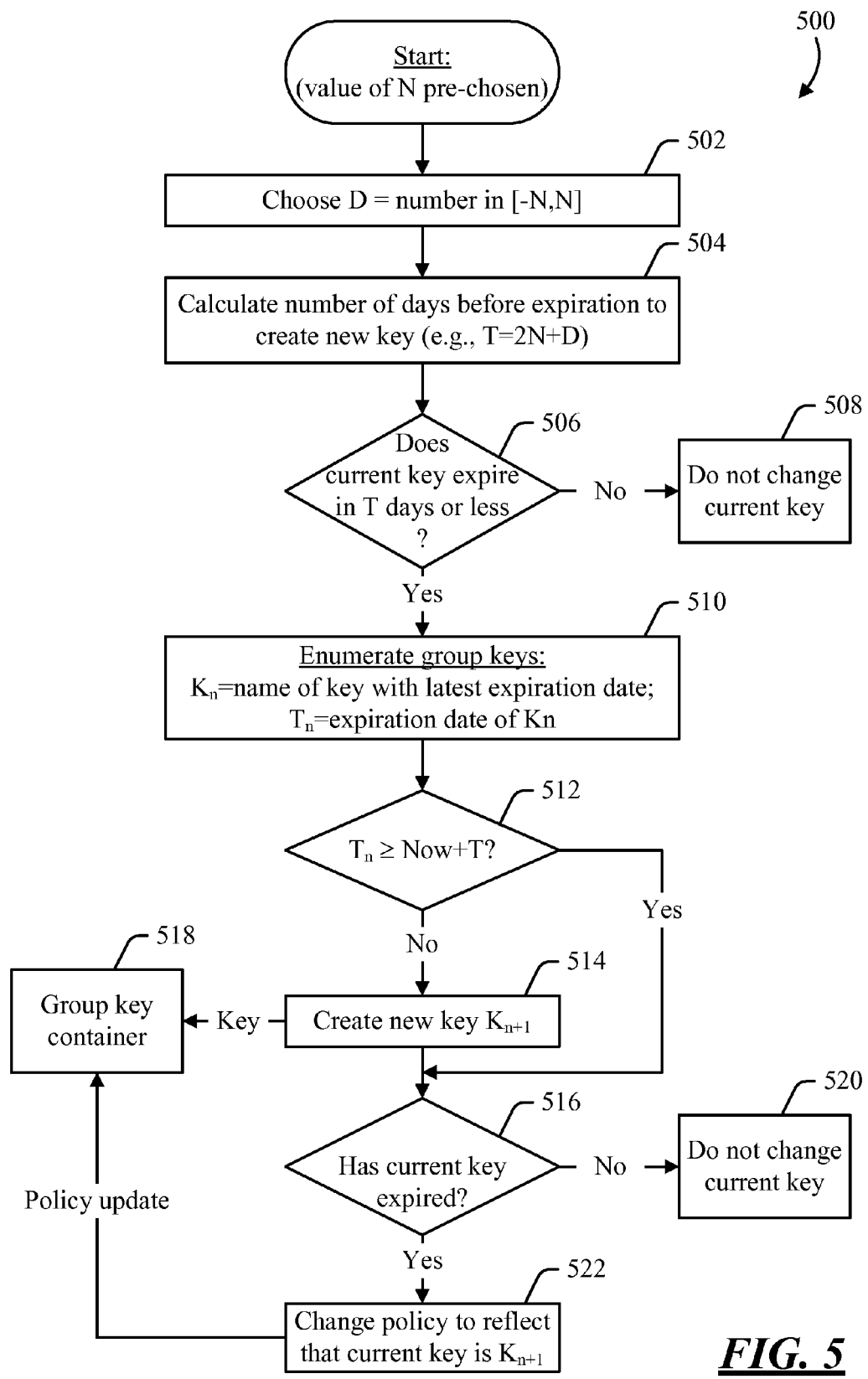
FIG. 5 shows an example process in which a domain controller may decide whether to create a new key.

FIG. 4 shows, in the form of a flow chart, an example process by which group keys are obtained and used by clients. Before turning to a description of FIG. 4, it is noted that the flow diagrams contained herein (both in FIG. 4 and in FIG. 5) are described, by way of example, with reference to components shown in FIGS. 1-3, although these processes may be carried out in any system and are not limited to the scenarios shown in FIG. 1-3. Additionally, each of the flow diagrams in FIGS. 4 and 5 shows an example in which stages of a process are carried out in a particular order, as indicated by the lines connecting the blocks, but the various stages shown in these diagrams may be performed in any order, or in any combination or sub-combination.

At 402, a client may contact a domain controller with a request to provide the set of keys for that group. If the client is not a member of the group (as determined at 404), then the domain controller does not provide the keys to the client (at 406). If the client is a member of the group, then at 408 the domain controller provides one or more keys for the group (e.g., the current key to be used for encryption, or possibly the full historical set of keys).

When the domain controller provides the key(s), it may provide various information along with the key(s). One example kind of information is the key value 410 (i.e., a representation of the value that may be provided as the key input to an encryption and/or decryption process, or data from which that value may be derived). Another example of the information that may be provided is the encryption algorithm to be used with the key (block 412). A policy that governs the key may specify that a particular encryption algorithm is to be used with the key, and an identification of this algorithm may be provided with the key at block 412. Another example of information that may be provided with the key is an indication of the expiration date of the key (block 414). The expiration date itself could be explicitly provided, or aging information that implies the expiration date of the key could be provided. (One example of information that implies the expiration date of a key is the creation date of the key together with its longevity.)

As noted above, the domain controller may provide the current group key, or may provide the full historical set of the group's keys. To elaborate on this point, data may still exist that has been encrypted with old keys—even currently expired keys—and thus a client may still make use of an old key. Keys may expire in the sense that one key (the current key) may supersede the use of other keys for new encryption (including re-encryption of old data), but since old data may exist that were encrypted with keys that are no longer current, the old keys are kept so that they may be used to decrypt old data (although, as noted above, a policy might call for something other than retaining all keys—e.g., a policy might call for the disposal of old keys as a mechanism of data destruction). Since the domain controller may not know whether a client that requests the key intends to use the key to encrypt new data or to decrypt old data, the domain controller may provide all of the existing keys for the group. The domain controller may provide, to a requesting client, an indication of which key is the current key (or the client may follow a rule to determine which key is the current key—e.g., the client might infer that the key with the latest expiration date is the current key).

At 416, the key may be used to perform a tangible action. For example, an application may use the current key to encrypt data, or may use the current key (or one of the older keys) to decrypt data. Other examples of tangible actions that may be performed with keys include authentication, seeding a pseudo-random number genitor, or any other use of keys.

When domain controllers synchronize with each other, an issue may arise due to the interaction of the facts that (a) keys expire and have to be replaced with new keys, and (b) synchronization may happen intermittently. Clients encrypting data with the current key may monitor keys for expiration and—if a key is nearing expiration—the client may create a new key, which will replace the current key when the current key expires. (Clients might monitor keys for expiration, or, alternatively, might be triggered to evaluate whether to create a new key when a group's key is requested by a client.) But if all clients discover at the same time that the key is nearly expired, then all of the clients might create new keys on different domain controllers in response to this discovery, because each client may be connected to a different domain controller. The creation of new keys by several different clients does not result in a conflict, since—after synchronization occurs—a rule can be applied to determine which (if any) of the two keys in the current key. However, while there is no conflict between the keys, this situation tends to lead to the unnecessary accumulation of keys. Suppose that keys have a longevity of sixty days, and further suppose that two clients, one connected to domain controller A and the other connected to the domain controller B, create new keys on Jan. 1, 2009 on both of domain controllers A and B. Eventually these domain controllers will synchronize, at which point each will have both of the keys. The keys may be timestamped, so that clients that retrieve the keys from the domain controllers can determine, at some level of granularity, which key was created latest and, therefore, which key will ultimately replace the expiring key as the current key. However, if one client had been aware that the other was already creating a replacement for the expiring key, then one of the clients might have avoided creating its own new key. But once each client has created its own new key, the possibility cannot be ruled out that the each of the keys has been used for some encryption job, and thus both keys are stored indefinitely so they can be used to decrypt whatever data might have been encrypted with either key. The problem of key management may be simplified if only one client had created its own new key—e.g., if the client connected to domain controller A created a key, and then that key had a chance to propagate to other domain controllers so that the other client could receive it and realize that the expiring key had already been updated. Techniques that are described below may be used to reduce the number of new keys created by multiple clients and stored by mirrored domain controllers, even in an environment where domain controllers synchronize intermittently.

FIG. 5 shows an example process in which a client may decide whether to create a new key. In general, a client may create a new key for a group somewhat in advance of the expiration of the current key. However, different clients connected to different domain controllers may create keys different amounts of time in advance. For example, client A may be set to create a key twelve days before the expiration of the current key (T−12) on domain controller A', and client B may be set to create a key eight days before the expiration of the current key (T−8) on domain controller B'. Thus, on day T−12, client A will create a new key on domain controller A', but client B will not on domain controller B'. As long as domain controllers A' and B' synchronize sometime between T−12 and T−8, client B will not create a new key, because it will already have received the key from domain controller B', which was created by client A on domain controller A' and synchronized to domain controller B', and will see that the original key (key n) has been superseded by the new key (key n+1) that client A has created. FIG. 5 shows an example process 500 that may be used to implement these principals.

Process 500 makes use of the following values:

N: a number that defines the average number of days before expiration that clients create new keys. In one example, N defines this average number of days in the sense that each client creates a new key 2N days before the key expires, plus or minus some randomization quantity, which is described below. (In lieu of days, any unit that represents an amount of time may be used.)

D: an arbitrarily-chosen number in [−N,N]. Each client has its own value of D, which causes variance between clients as to how many days prior to expiration they will create a new key. Thus, each client creates a new key 2N+D days before the current key expires, so different clients may create keys on different days as long as they have different values of D. (Different clients could share the same value of D although, typically, if there are a plurality of clients and domain controllers for a domain, at least two of them will have different values of D so that at least two clients would have different key-creation days.) In this sense, different values of D may be chosen for different clients, although the same value of N may be used for the various clients.

The value of N may be the same for to the full set of clients that administer a domain, while each client may have its own value of D (although it is possible that two or more clients could be assigned the same value of D). Thus, at the start of process 500, the value of N is pre-chosen.

At 502, a value is chosen for D for a given client. As noted above, D is in the range [−N,N], so −N≦D≦N.

At 504, the client chooses how many days before expiration of the current key it will create a new key. As noted above, a client may calculate this number of days as a function of N and D—e.g., 2N+D. Thus, in the example of FIG. 5, the client determines that it will create a new key if the current key has T or fewer days until it expires, where T is equal to 2N+D. As noted above, different values of D may be chosen for different clients. Thus, in order to determine the number of days in advance of expiration that each client creates a key, a first and second values are chosen for the first and second clients, respectively, and a third value is chosen which applies to all clients. (Two different values of D are examples of the first and second values, and 2N is an example of the third value.) The amount of time before expiration to create a new key is calculated (for the first domain controller) by adding the first value and the third value, and (for the second client) by adding the second value and the third value. In this way, different instances of T may be calculated for different clients; the client with the lower value of T concludes, closer to the expiration of the current key, that a new key is to be created—by which time a new key may already have been created by the client with the higher value of T.

At 506, it is determined whether the current key expires in T days or less. There are various triggers that could cause the client to make this determination. For example, the determination may be triggered by a client's receiving a group's key (e.g., FIG. 4, at 402), or the client might self-trigger the determination by monitoring keys that it stores in order to determine if those keys are nearing expiration.

If there are more than T days remaining before expiration, then process 500 does not create a new key (at 508).

On the other hand, if the current key does expire in T days or less, then (at 510) process 500 enumerates the keys for the group (i.e., keys 1-n, where $K_n$ is the name of the key with the latest expiration date, and $T_n$ is the expiration date of $K_n$).

Once it has been determine which key ($T_n$) for a group has the latest expiration date, it is determined (at 512) whether that expiration date is within T days of the current time (i.e., whether $T_n \leq$ now+T, where "now" is the current time). If the process find that (as of the time that the finding is made) there is a key with at least T days ahead until expiration, then the process continues to 516 without creating a new key. Even though it was determined at 506 that the current key has T days or less until expiration, there might be a key that has more than T days until expiration. A key may be created somewhat earlier than the policy governing use of the group's keys designates that key as the current key. Thus, it might be the case that $K_{n-1}$ is the current key (expiring in T days or less), but that another client has already created key $K_n$, which is not yet the current key but is available to replace $K_{n-1}$ when $K_{n-1}$ expires. (Creating a new key before designating that key as the current key gives the key time to propagate to other domain controllers before it is used to encrypt data. If a client contacts a domain controller that does not yet have the new key, then the client will not be able to decrypt any data that was encrypted with the new key. By giving the key time to propagate before it is used, the chance that this type of decryption failure will occur is reduced.)

If it is determined at 512 that the key with the latest expiration date has T days or less until expiration, then the process continues to 514, where a new key is created. If $K_n$ is the existing key with the latest expiration date, then the new key to be created may be referred to as key $K_{n+1}$, and it has expiration date $T_{n+1}$. The new key may be stored in the key container 518 for the group to which the key applies.

Once 516 is reached (either from 512 or from 514), it is determined whether the current key has expired. If the current key has not expired, then, in this example, the current key is not changed (at 520). If the current key has expired, then the policy governing the use of the group's key is changed to reflect that the current key is key $K_{n+1}$ (at 522). This policy update may be stored in key container 518.

Figure 6:
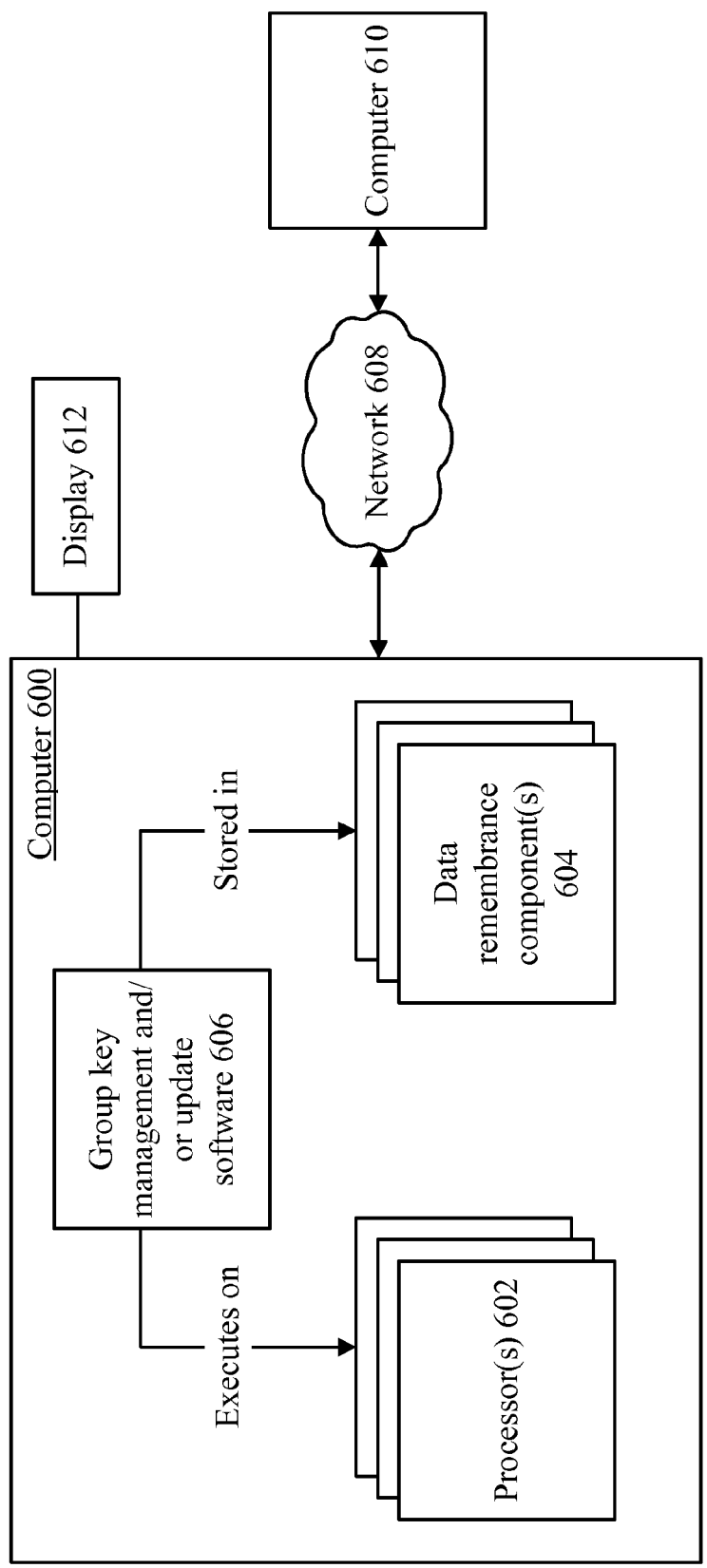
FIG. 6 is a block diagram of example components that may be used in connection with implementations of the subject matter described herein.

FIG. 6 shows an example environment in which aspects of the subject matter described herein may be deployed.

Computer 600 includes one or more processors 602 and one or more data remembrance components 604. Processor(s) 602 are typically microprocessors, such as those found in a personal desktop or laptop computer, a server, a handheld computer, or another kind of computing device. Data remembrance component(s) 604 are components that are capable of storing data for either the short or long term. Examples of data remembrance component(s) 604 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 600 may comprise, or be associated with, display 612, which may be a cathode ray tube (CRT) monitor, a liquid crystal display (LCD) monitor, or any other type of monitor.

Software may be stored in the data remembrance component(s) 604, and may execute on the one or more processor(s) 602. An example of such software is group key management and/or update software 606, which may implement some or all of the functionality described above in connection with FIGS. 1-5, although any type of software could be used. Software 606 may be implemented, for example, through one or more components, which may be components in a distributed system, separate files, separate functions, separate objects, separate lines of code, etc. A computer (such as a server computer, acting as a domain controller) in which a program is stored on hard disk, loaded into RAM, and executed on the computer's processor(s) typifies the scenario depicted in FIG. 6, although the subject matter described herein is not limited to this example.

The subject matter described herein can be implemented as software that is stored in one or more of the data remembrance component(s) 604 and that executes on one or more of the processor(s) 602. As another example, the subject matter can be implemented as instructions that are stored on one or more computer-readable storage media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 602) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 600 may be communicatively connected to one or more other devices through network 608. Computer 610, which may be similar in structure to computer 600, is an example of a device that can be connected to computer 600, although other types of devices may also be so connected. Various devices (e.g., domain controllers 302-306, shown in FIG. 3) may communicate with each other over a network. The network may thus provide a mechanism through which synchronization is performed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system to maintain a set of keys of a group, the system comprising:
a plurality of domain controllers, each domain controller being a hardware server machine, wherein each of said domain controllers administers a domain that includes a group, and wherein each of said domain controllers stores:
a container associated with said group, said container storing:
a plurality of keys that includes a first key;
information that states or implies a first expiration date for said first key; and
metadata that indicates that said first key is a current key for said group;
said domain controllers being connected to a plurality of clients that are set to create a new key when there is T time, or less, remaining before said first expiration date, said plurality of clients including a first client and a second client said first domain client using a value of T that is equal to a first amount of time, said second client using a value of T that is equal to a second amount of time, said first amount of time being different from said second amount of time.

2. The system of claim 1, wherein a first value in a range is chosen for said first client, wherein a second value, which is in said range and is different from said first value, is chosen for said second client, wherein said first client calculates said first amount of time by adding said first value to a third value, and wherein said second client calculates said second amount of time by adding said second value to said third value.

3. The system of claim 1, wherein each of said plurality of clients makes a determination, before creating said new key, that there is no key for said group whose expiration date occurs more than T time ahead of when the determination is being made, each of said clients using its own value of T in making said determination.

4. The system of claim 1, wherein one of said plurality of domain controllers receives said new key from one of said clients that connects to said one of said plurality of domain controllers, and wherein said one of said plurality of domain controllers propagates said new key to each of the other ones of said plurality of domain controllers.

5. The system of claim 4, wherein each of said plurality of clients determines that a current key for said group has expired and changes said metadata to indicate that said new key is now the current key for said group.

6. The system of claim 1, wherein one of said plurality of clients is triggered to evaluate whether a current key for said group expires in T time or less based on a request, from a client, for said group's keys.

7. The system of claim 1, wherein said plurality of keys include keys that have expired.

8. The system of claim 1, wherein at least two of said domain controllers are physically separate components that are separated by physical distance and that synchronize with each other through a network.

9. A method of updating a key, the method comprising:
using one or more processors to perform acts comprising:
choosing a first amount of time in advance of a first expiration of a first key that a first client will create a second key to replace said first key;
choosing a second amount of time in advance of said first expiration that a second client will create said second key to replace said first key, said second amount of time being less than said first amount of time, said first client being connected to a first domain controller, said second client being connected to a second domain controller, said first domain controller and said second domain controller being part of a collection of domain controllers that administer a domain;
determining, by said first client, that said first key will expire in said first amount of time or less; and updating metadata to reflect that said second key has replaced said first key as a current key.

10. The method of claim 9, wherein said first domain controller and said second domain controller each maintain a container that contains data relating to keys for a group, said first key and said second key being among said keys, said metadata being contained within said container, said metadata indicating which of said keys is a current key for said group.

11. The method of claim 9, said acts further comprising:
choosing a third amount of time that is within a range; and
choosing a fourth amount of time number that is within said range, wherein said first amount of time is equal to said third amount of time plus a fifth amount of time, and wherein said second amount of time is equal to said fourth amount of time plus said fifth amount of time.

12. The method of claim 9, said acts further comprising:
finding, by said first client, that said first domain controller does not store any key for said group that expires more than said first amount of time ahead of when said finding is performed; and
based on said finding, creating said second key.

13. The method of claim 9, said acts further comprising:
synchronizing said second domain controller with said first domain controller so that said first domain controller and said second domain controller each have a copy of said second key.

14. The method of claim 9, said acts further comprising:
sending said second key, and data that that comprises or implies a second expiration of said second key, from said first domain controller to said second domain controller;
within said second amount of time before said first expiration, determining, by said second client, that a current key for a group is nearing expiration;
determining, based on said second key and said second expiration, not to create a new key for said group.

15. The method of claim 9, wherein said first domain controller and said second domain controller are physically separate components that are separated by physical distance, and wherein said first domain controller sends said second key to said second domain controller over a network.

16. One or more computer-readable storage devices or memories that store executable instructions that, when executed by a computer, cause the computer to perform acts comprising:
receiving, from a requestor, a request to provide a key that is associated with a group;
determining that said request is made by, or on behalf of, an entity that is a member of said group;
providing, to said requestor, a set of keys associated with said group, said set of keys including said key, and further providing to said requestor an indication that said key is a current key for said group,
wherein said request is received from a first client, there being a plurality of clients that participate in a domain in which said group is recognized, wherein said first client is one of said plurality of clients, wherein each of said clients creates a new key for said group when a current key for said group will expire within a first amount of time, T, at least two of said clients having different values of T from each other.

17. The one or more computer-readable storage devices or memories of claim 16, wherein said acts further comprise:
determining that, an expiration date of said key is at least a second amount of time ahead of when said request is made.

18. The one or more computer-readable storage devices or memories of claim 16, wherein said acts further comprise:
creating said new key by said first client;
communicating said key from said first client to a first domain controller, said first domain controller being one of a plurality of domain controllers that administer a domain; and
propagating said new key from said first domain controller to a second domain controller, said second domain controller being one of said plurality of domain controllers.

19. The one or more computer-readable storage devices or memories of claim 18, wherein said second domain controller is connected to a second client, said second client being one of said plurality of clients that participate in said domain, said second client having a lower value of T than said first client.

* * * * *